US012446821B2

(12) United States Patent
Yoshihara et al.

(10) Patent No.: US 12,446,821 B2
(45) Date of Patent: Oct. 21, 2025

(54) MUSCLE RELAXATION MONITORING APPARATUS AND CALIBRATION PROCESSING METHOD

(71) Applicants: NIHON KOHDEN CORPORATION, Tokyo (JP); Shunichi Takagi, Tokyo (JP)

(72) Inventors: Hiroshi Yoshihara, Tokorozawa (JP); Shigeyoshi Kitamura, Tokorozawa (JP); Kazuya Nagase, Tokorozawa (JP); Shunji Iwata, Tokorozawa (JP); Shunichi Takagi, Tokyo (JP)

(73) Assignees: NIHON KOHDEN CORPORATION, Tokyo (JP); Shunichi TAKAGI, Tokyo (JP)

( * ) Notice: Subject to any disclaimer, the term of this patent is extended or adjusted under 35 U.S.C. 154(b) by 789 days.

(21) Appl. No.: 17/773,451

(22) PCT Filed: Oct. 23, 2020

(86) PCT No.: PCT/JP2020/039952
§ 371 (c)(1),
(2) Date: Apr. 29, 2022

(87) PCT Pub. No.: WO2021/085337
PCT Pub. Date: May 6, 2021

(65) Prior Publication Data
US 2022/0401008 A1 Dec. 22, 2022

(30) Foreign Application Priority Data
Oct. 31, 2019 (JP) .................................. 2019-198592

(51) Int. Cl.
*A61B 5/00* (2006.01)
*A61B 5/395* (2021.01)

(52) U.S. Cl.
CPC ............ *A61B 5/395* (2021.01); *A61B 5/4821* (2013.01); *A61B 2560/0223* (2013.01)

(58) Field of Classification Search
CPC .................. A61B 5/395; A61B 5/4821; A61B 2560/0223
See application file for complete search history.

(56) References Cited

U.S. PATENT DOCUMENTS 10,869,609 B2 * 12/2020 Snow ........................ A61B 5/24
10,939,867 B2 * 3/2021 Bray, Jr. ................... A61B 5/24
(Continued)

FOREIGN PATENT DOCUMENTS

| JP | 2015-506245 A | 3/2015 |
|---|---|---|
| WO | 2013/112854 A1 | 8/2013 |

OTHER PUBLICATIONS

International Search Report (PCT/ISA/210) issued Mar. 4, 2021 by the International Searching Authority in counterpart International Application No. PCT/JP2020/039952.
(Continued)

*Primary Examiner* — May A Abouelela
(74) *Attorney, Agent, or Firm* — Sughrue Mion, PLLC

(57) ABSTRACT

A muscle relaxation monitoring apparatus includes a calibration processing section for performing a calibration process that electrically stimulates a nerve which is an observation portion of a subject, by a predetermined stimulation current value at a predetermined stimulation timing, and that acquires a stimulation current value of a supramaximal stimulation exceeding a maximal stimulation of the subject, based on an amplitude peak value of an electric signal that is based on a stimulation response of a muscle due to the electrical stimulation. The calibration processing section performs, when the subject is in an awake state, the calibration process while using a first stimulation timing that is preset, as the stimulation timing, and performs, when the (Continued)

subject is in a muscle relaxation state, the calibration process while using a second stimulation timing that is longer in period than the first stimulation timing, as the stimulation timing.

5 Claims, 3 Drawing Sheets

(56) References Cited

U.S. PATENT DOCUMENTS

| | | | | |
|---|---|---|---|---|
| 11,166,648 | B2* | 11/2021 | Spoof | A61B 5/4519 |
| 11,259,746 | B2* | 3/2022 | Spoof | A61N 1/36014 |
| 11,529,107 | B2* | 12/2022 | Dearing | A61B 5/316 |
| 11,567,573 | B2* | 1/2023 | Berenzweig | G06F 3/011 |
| 11,596,337 | B2* | 3/2023 | Amaya | A61B 5/24 |
| 11,666,264 | B1* | 6/2023 | Morun | H05K 1/162 |
| | | | | 600/372 |
| 11,752,335 | B1* | 9/2023 | Burkes-Henderson | |
| | | | | A61B 5/4848 |
| | | | | 607/2 |
| 11,797,087 | B2* | 10/2023 | Barachant | A61B 5/7267 |
| 11,938,313 | B2* | 3/2024 | Cadwell | A61N 1/372 |
| 12,059,248 | B2* | 8/2024 | Hulvershorn | A61B 5/6825 |
| 2004/0254617 | A1* | 12/2004 | Hemmerling | A61B 7/006 |
| | | | | 607/48 |
| 2005/0096716 | A1* | 5/2005 | Stadler | A61M 5/1723 |
| | | | | 607/116 |
| 2006/0270943 | A1* | 11/2006 | Kamataki | A61B 5/389 |
| | | | | 600/554 |
| 2009/0005655 | A1* | 1/2009 | Frank | A61B 5/0836 |
| | | | | 600/301 |
| 2009/0171417 | A1* | 7/2009 | Philipson | A61N 1/36003 |
| | | | | 607/48 |
| 2009/0247893 | A1* | 10/2009 | Lapinlampi | A61B 5/369 |
| | | | | 600/546 |
| 2013/0204155 | A1 | 8/2013 | Brull et al. | |
| 2018/0256097 | A1* | 9/2018 | Bray | A61B 5/7282 |
| 2019/0008453 | A1 | 1/2019 | Spoof | |
| 2019/0357810 | A1* | 11/2019 | Spoof | A61B 5/4519 |
| 2021/0038120 | A1* | 2/2021 | Batsman | A61B 5/1106 |
| 2021/0076982 | A1* | 3/2021 | Sarkela | A61N 1/37258 |

OTHER PUBLICATIONS

Written Opinion (PCT/ISA/237) issued Mar. 4, 2021 by the International Searching Authority in counterpart International Application No. PCT/JP2020/039952.

* cited by examiner

MUSCLE RELAXATION MONITORING APPARATUS AND CALIBRATION PROCESSING METHOD

TECHNICAL FIELD

The presently disclosed subject matter relates to a muscle relaxation monitoring apparatus for identifying the muscle relaxation state or awake state of a subject such as a patient, and also to a calibration processing method.

BACKGROUND

PTL 1 described below discloses a technique for monitoring the muscle relaxation state of the subject due to a muscle relaxant agent that is administered during surgery. In the anesthesia monitoring system disclosed in PTL 1 described below, a predetermined stimulation mode such as the Train-Of-Four (TOF) method is set, and the muscle relaxation state of the subject is quantitatively monitored based on a muscle contraction force of the observation portion that is induced when an electrical stimulation of a predetermined current value is applied to a peripheral nerve leading to a portion (muscle) to be observed that is a part of the body of the subject.

CITATION LIST

Patent Literature

[PTL 1] JP-T-2015-506245

SUMMARY

Technical Problem

When the system of PTL 1 is to be used, in order to correctly know the muscle relaxation state of the subject during surgery, the electrical stimulation to be applied to the subject must be set to the supramaximal stimulation (a stimulation exceeding the maximal stimulation that causes all muscle fibers in the observation portion, to contract, and increased by, for example, 10% to 30% from the maximal stimulation) by which, even when the current value is further increased, the muscle response is not increased. In the system, therefore, a calibration process is performed before a muscle relaxant agent is administered, and a stimulation current value that causes the supramaximal stimulation according to the muscle relaxation state of the subject is detected.

In the system of PTL 1, as described above, a calibration process is performed when the muscle relaxation state is to be monitored, thereby acquiring the stimulation current value of the supramaximal stimulation of each subject. In the case of emergency surgery or the like, however, a calibration process cannot sometimes be performed. In such a case, the muscle relaxation state is monitored by using a preset stimulation current value (for example, 50 mA) of the supramaximal stimulation as an emergency stimulation current value.

However, the emergency stimulation current value is preset at a relatively high level in order to cope with many subjects, and therefore susceptible to noises. Consequently, there is sometimes a case where the muscle relaxation state of the subject cannot be accurately monitored.

In a recovery phase after administration of a muscle relaxant agent, the muscle relaxant agent is re-administered by the operative procedure to maintain the muscle relaxation state, or a muscle relaxation recovery agent (antagonist) is administered to recover the muscle relaxation state. However, the preset emergency stimulation current value does not always exceed the stimulation current value of the supramaximal stimulation of the subject. In the case where the preset emergency stimulation current value is smaller than the stimulation current value of the supramaximal stimulation of the subject, therefore, the detected TOF ratio and the like are unstable, and there arises a problem in that it is difficult to correctly know the timing when a medical agent is to be administered.

As described above, in order to correctly monitor the muscle relaxation state of the subject, and administer a medical agent at an adequate timing in a recovery phase from the muscle relaxation state, it is very important to acquire the stimulation current value of the supramaximal stimulation of the subject. In the present circumstances, in the case where a calibration process was not performed, however, the muscle relaxation state of the subject is monitored, after administration of a muscle relaxant agent, by using the emergency stimulation current value that is set as described above. In medical sites, therefore, it is requested to develop a novel muscle relaxation monitoring apparatus having a function of a calibration process in which the stimulation current value of the supramaximal stimulation of the subject in the muscle relaxation state can be acquired.

The presently disclosed subject matter has been conducted in view of the above-described problem of the prior art. It is an object of the presently disclosed subject matter to provide a muscle relaxation monitoring apparatus and calibration processing method that can detect a stimulation current value that causes the supramaximal stimulation according to a subject in the muscle relaxation state.

Solution to Problem

The muscle relaxation monitoring apparatus of the presently disclosed subject matter including a calibration processing section for performing a calibration process that electrically stimulates a nerve of a subject by a predetermined stimulation current value at a predetermined stimulation timing, and that acquires a stimulation current value of a supramaximal stimulation exceeding a maximal stimulation of the subject, based on an amplitude peak value of an electric signal that is based on a stimulation response of a muscle of the subject due to the electrical stimulation, wherein the calibration processing section performs, when the subject is in an awake state, the calibration process while using a first stimulation timing that is preset, as the stimulation timing, and, when the subject is in a muscle relaxation state, performs the calibration process while using a second stimulation timing that is longer in period than the first stimulation timing, as the stimulation timing.

Effects of the Invention

According to the presently disclosed subject matter, it is possible to detect a stimulation current value that causes the supramaximal stimulation according to a subject in the muscle relaxation state.

DESCRIPTION OF EMBODIMENTS

Hereinafter, an embodiment of the presently disclosed subject matter will be described in detail with reference to the drawings. The presently disclosed subject matter is not limited by the following embodiment. All of other modes, embodiments, operation techniques, and the like that can be conceived by those skilled in the art or the like based on the embodiment should be included in the scope of the presently disclosed subject matter.

<Configuration of Apparatus>

Figure 1:
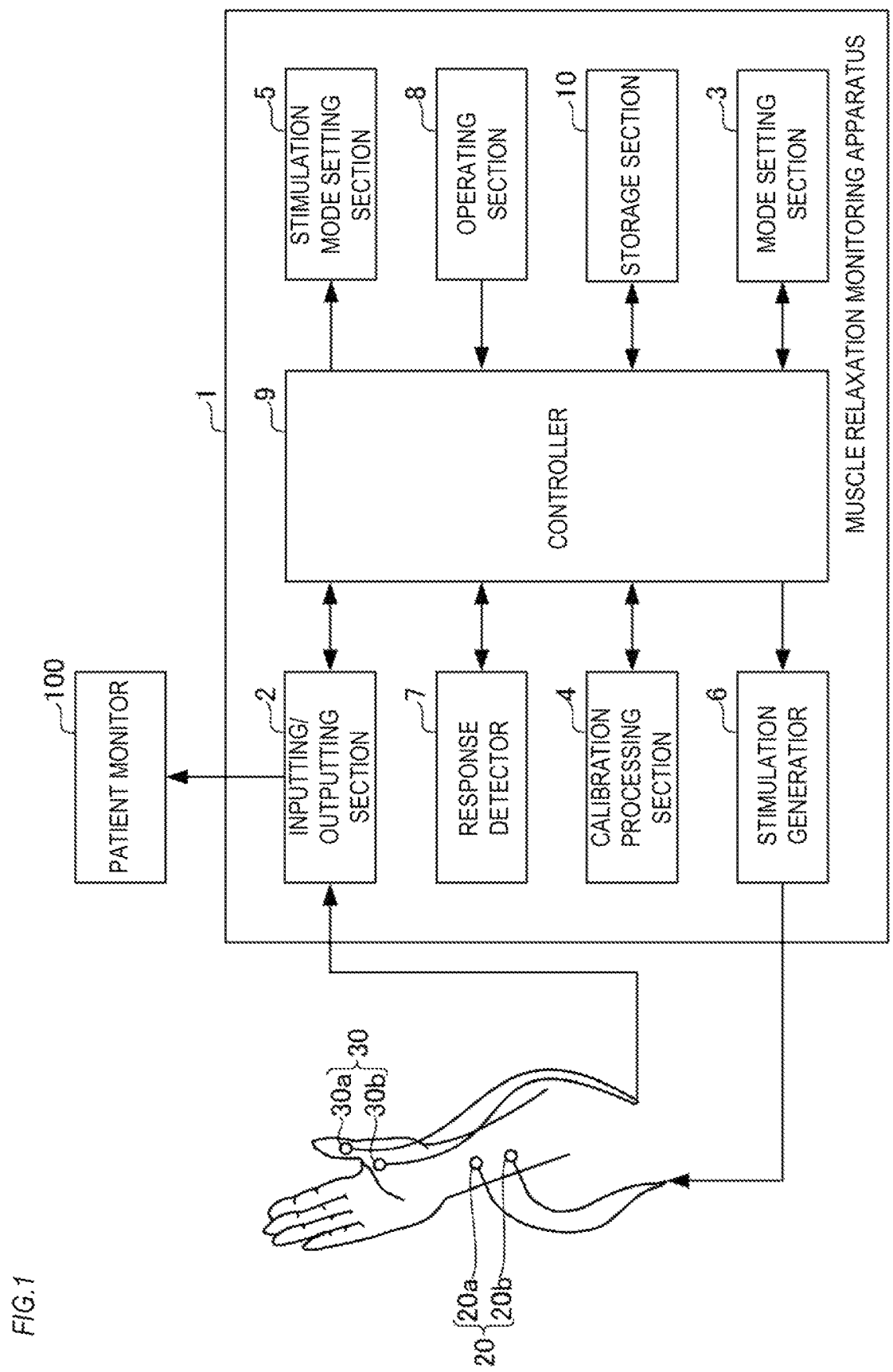
FIG. 1 illustrates the configuration of a muscle relaxation monitoring apparatus of an embodiment of the presently disclosed subject matter.

Referring to FIG. 1, first, the configuration of a muscle relaxation monitoring apparatus 1 of the embodiment of the presently disclosed subject matter will be described.

The muscle relaxation monitoring apparatus 1 is wiredly or wirelessly communicably connected to a patient monitor 100 (such as a bedside monitor, a transport monitor, or a medical monitor). Display contents corresponding to a stimulation response value that is detected by the muscle relaxation monitoring apparatus 1 are displayed on the patient monitor 100.

A stimulation electrode section 20 and a detection electrode section 30 are connected to the muscle relaxation monitoring apparatus 1. The muscle relaxation monitoring apparatus 1 applies an electrical stimulation of a predetermined current value, to a nerve in an observation portion of the subject through the stimulation electrode section 20. The muscle relaxation monitoring apparatus 1 acquires an electric signal that is based on a stimulation response (muscle response) of the observation portion due to the electrical stimulation, through the detection electrode section 30.

The muscle relaxation monitoring apparatus 1 of the embodiment is a so-called electromyography (EMG) that quantitatively detects the muscle relaxation state of the subsect based on the action potential of muscle fibers in the observation portion that is induced when an electrical stimulation of the predetermined current value is applied to a peripheral nerve leading to a muscle which is the observation portion of the subject.

The stimulation electrode section 20 is configured by a pair of stimulation electrodes 20a, 20b that are attachable to and detachable from the skin surface above the peripheral nerve leading to the muscle which is the observation portion of the subject, and performs an electrical stimulation of a preset predetermined current value on the peripheral nerve leading to the muscle in the observation portion. In the stimulation electrode section 20, in the case where the polarity of the stimulation electrode 20a is plus, for example, that of the stimulation electrode 20b is minus. In the stimulation electrode section 20, in the case where the observation portion is the adductor pollicis muscle, for example, both the stimulation electrodes 20a, 20b are attached to the skin surface above the ulnar nerve leading to the adductor pollicis muscle, while being separated by a predetermined interval from each other. The stimulation electrode section 20 is connectable to and disconnectable from the muscle relaxation monitoring apparatus 1, and, when a failure or the like occurs, can be replaced with another one.

The detection electrode section 30 is configured by a pair of detection electrodes 30a, 30b that are attachable to and detachable from the skin surface of the observation portion of the subject, detects the action potential of the muscle in the observation portion due to the electrical stimulation performed by the stimulation electrode section 20, as a stimulation response, and outputs an electric signal corresponding to the stimulation response to the muscle relaxation monitoring apparatus 1. In the detection electrode section 30, in the case where the polarity of the detection electrode 30a is plus, for example, that of the detection electrode 30b is minus. In the detection electrode section 30, in the case where the observation portion is the adductor pollicis muscle, for example, the detection electrode 30a of the plus polarity is attached to the skin surface above the flexor tendon of, for example, the thumb that functions as a fixation portion, and the detection electrode 30b of the minus polarity is attached to the skin surface above the adductor pollicis muscle so as to enable the motion of the adductor pollicis muscle to be detected. The detection electrode section 30 is connectable to and disconnectable from the muscle relaxation monitoring apparatus 1, and, when a failure or the like occurs, can be replaced with another one.

Then, the configuration of the muscle relaxation monitoring apparatus 1 will be described. The muscle relaxation monitoring apparatus 1 may include an inputting/outputting section 2, a mode setting section 3, a calibration processing section 4, a stimulation mode setting section 5, a stimulation generator 6, a response detector 7, an operating section 8, a controller 9, and a storage section 10. The muscle relaxation monitoring apparatus 1 operates by receiving power from the patient monitor 100 to which the apparatus is connected.

When the electric signal that corresponds to the action potential of the muscle in the observation portion and detected by the detection electrode section 30 is input, the inputting/outputting section 2 outputs the signal to the calibration processing section 4 or the response detector 7. When the stimulation response value that is obtained when the muscle in the observation portion is electrically stimulated in accordance with the stimulation mode is input from the response detector 7, the inputting/outputting section 2 outputs the stimulation response value to the patient monitor 100. As a result, the input stimulation response value is displayed on a screen of the patient monitor 100.

The mode setting section 3 sets a calibration mode that is to be executed in the calibration processing section 4. Based on operation instructions supplied from the operating section 8, the mode setting section 3 sets, as the calibration mode, "pre-muscle relaxation calibration mode" in which a calibration process is performed on the subject to whom a muscle relaxant agent has not yet been administered, and who is in the awake state, and "post-muscle relaxation calibration mode" in which a calibration process is performed on the subject to whom a muscle relaxant agent has been administered, and who is in the muscle relaxation state.

"Pre-muscle relaxation calibration mode" is a mode in which an electrical stimulation of a predetermined current value is performed on the subject to whom a muscle relaxant agent has not yet been administered, and who is in the awake state, a stimulation current value according to the maximal stimulation of each subject is detected, and, based on the detected stimulation current value, a stimulation current value according to the supramaximal stimulation of the subject is acquired.

In the pre-muscle relaxation calibration mode, in order to acquire the stimulation current value of the supramaximal stimulation of the subject in a short time period, "pre-muscle relaxation stimulation timing" that is the first stimulation timing is set to, for example, 2 Hz (interval of 0.5 seconds). In the case where the subject is in the awake state, even when a relatively short period such as 2 Hz is set, a muscle recovers to the state obtained before contraction (state where the muscle can again act), and therefore a correct calibration process can be performed.

"Post-muscle relaxation calibration mode" is a mode in which an electrical stimulation of a predetermined current value is performed on the subject to whom a muscle relaxant agent has been administered, a stimulation current value according to the maximal stimulation of each subject is detected, and, based on the detected stimulation current value, a stimulation current value according to the supramaximal stimulation of the subject is acquired.

The subject to whom a muscle relaxant agent has been administered enters, after about 1 to 2 minutes from the administration of the agent, a muscle relaxation state which is so deep that a stimulation response due to a train-of-four stimulation (TOF stimulation) cannot be confirmed. Therefore, the post-muscle relaxation calibration mode is conducted in the case where, when an electrical stimulation of a predetermined stimulation current value, such as a twitch stimulation or a TOF stimulation is performed on at least the subject, a stimulation response due to the electrical stimulation can be confirmed, for example, in a recovery phase after the administration of the muscle relaxant agent.

The contents of the process in the post-muscle relaxation calibration mode are basically identical with those of the process in the pre-muscle relaxation calibration mode, but their stimulation timings are different from each other. In the pre-muscle relaxation calibration mode, the pre-muscle relaxation stimulation timing is set to "2 Hz," and, in the post-muscle relaxation calibration mode, "post-muscle relaxation stimulation timing" that is the second stimulation timing is employed. The post-muscle relaxation stimulation timing is set to "1 Hz or less" that is longer than the period of the pre-muscle relaxation timing in the pre-muscle relaxation calibration mode.

In the subject who is after muscle relaxation, a muscle is caused to relax by the muscle relaxant agent, and therefore the fade phenomenon causes the stimulation response due to an electrical stimulation on the muscle, to be somewhat weaker than the stimulation response before muscle relaxation. However, it is said that, even when the subject is in a muscle relaxation state, as a physiological response, a muscle contraction state recovers from the muscle contraction state to a state obtained before the muscle contraction in about 1 second. "Fade phenomenon" means a phenomenon in which the ratio of contracting ones of constrictor muscle fibers in a muscle fiber bundle in a muscle of the observation portion is reduced in a stepwise manner in accordance with the degree of progress of the muscle relaxation state, and the amplitude peak value that is based on the stimulation response of the muscle contraction attenuates.

The post-muscle relaxation stimulation timing is set based on physiological finding such as described above, is longer in period than at least the pre-muscle relaxation stimulation timing, and is set in accordance with a timing when, after a muscle of the subject in the muscle relaxation state contracts, the muscle recovers to the state obtained before the muscle contraction. Alternatively, the post-muscle relaxation stimulation timing may be set so as to be able to acquire the stimulation current value of the supramaximal stimulation according to the subject in the muscle relaxation state, based on factors such as the dosage amount of the muscle relaxant agent administered to the subject, the elapsed time after administration of the muscle relaxant agent, and the metabolism (vital signs such as the blood pressure and the heart rate) of the subject.

Preferably, the interval of the post-muscle relaxation stimulation timing is in a range of 0.5 Hz to 1 Hz (interval of 1 to 2 seconds). When the timing is set in the range, the timing enables the muscle that is electrically stimulated, to recover from contraction to the state obtained before the muscle contraction, and the time period of the calibration process to be shortened. When the subject in the muscle relaxation state is electrically stimulated at a timing that is set in the above-described range, therefore, the calibration process can be performed while avoiding a timing during the recovery of the muscle to the state obtained before the muscle contraction, and in a state where the muscle contraction completely recovers.

The calibration processing section 4 executes a predetermined calibration process in accordance with the pre-muscle relaxation calibration mode or post-muscle relaxation calibration mode that is set in the mode setting section 3. In accordance with the selected mode, the calibration processing section 4 executes the calibration process, and acquires the stimulation current value of the supramaximal stimulation of the subject based on the stimulation current value of the maximal stimulation of the subject that is detected in the process.

In the calibration process, specifically, the calibration processing section 4 reduces a preset stimulation current value (the initial stimulation current value: for example, 60 mA) in steps of a predetermined current value at each predetermined stimulation timing, and detects the peak value (the absolute value of the maximum displacement (the difference between the maximum value and the minimum value) in one period) of the amplitude of an electric signal (action potential) due to a stimulation response of a muscle that is in the observation portion to which the electrical stimulation is applied. In the calibration process, the calibration processing section 4 further detects the stimulation current value of the maximal stimulation of the subject based on a result of a comparison (behavior of the peak value before and after the reduction of the current value) of peak values before and after the reduction of the detected current value, and acquires the stimulation current value of the supramaximal stimulation of the subject based on the stimulation current value of the maximal stimulation. The calibration processing section 4 causes the acquired stimulation current value of the supramaximal stimulation to be stored in the storage section 10.

The emergency stimulation current value that is used in the executed muscle relaxation monitoring mode is changed to the stimulation current value of the supramaximal stimulation of the subject that is acquired in the post-muscle relaxation calibration mode. Hereinafter, the controller 9 continues the muscle relaxation monitoring mode while using the acquired stimulation current value.

The calibration process is not limited to the above-described process contents in which the process is started from the preset stimulation current value (the initial stimulation current value: for example, 60 mA), and the stimulation current value of the supramaximal stimulation is acquired based on the stimulation current value of the maximal stimulation of the subject while reducing the stimulation current value in steps of a predetermined current value at each pre-muscle relaxation stimulation timing (or at each post-muscle relaxation stimulation timing). An applicable calibration process may be any process in which the stimulation current value of the supramaximal stimulation of the subject can be acquired based on the amplitude peak value according to the stimulation response in the case where an electrical stimulation of a predetermined current value is applied to the subject.

The stimulation mode setting section 5 performs a process in which one of a plurality of preset stimulation modes is appropriately changed to another one of the modes in accordance with the degree of progress of the muscle relaxation of the subject. Examples of the stimulation modes are "single stimulation mode", "Train-Of-Four simulation (TOF) mode", "Double Burst Stimulation (DBS) mode", "Tetanic stimulation (TET) mode", and "Post-Tetanic Count stimulation (PTC) mode". The stimulation mode setting section 5 sets an adequate stimulation mode in accordance with the degree of progress of the muscle relaxation, according to instructions from the controller 9.

The stimulation generator 6 is configured by an electric circuit for generating a stimulation pattern of a predetermined current value. The stimulation generator 6 performs a predetermined electrical stimulation (an electrical stimulation according to the stimulation current value in the calibration process, or that according to the stimulation mode that is set by the stimulation mode setting section 5) on a peripheral nerve leading to the muscle of the observation portion of the subject, through the stimulation electrode section 20.

When the response detector 7 receives the electric signal that is based on the stimulation response of the muscle in the observation portion, through the inputting/outputting section 2, the response detector acquires the stimulation response value that is based on the electric signal. When the muscle relaxation monitoring mode is selected as an operation mode, and the TOF mode is selected as the stimulation mode, for example, the response detector 7 acquires, as the stimulation response, a ratio (ratio of a first stimulation and a fourth stimulation) of peak values of amplitudes in the electric signal according to the action potential of the muscle of the observation portion, as "TOF ratio," or the number of signals that are found in a predetermined time period, as "TOF count." The response detector 7 outputs the acquired stimulation response value to the patient monitor 100 through the inputting/outputting section 2.

When the calibration mode is selected as the operation mode, furthermore, the response detector 7 detects the amplitude peak value that is based on the electrical stimulation of the predetermined current value and performed by the stimulation generator 6, and outputs the peak value to the calibration processing section 4.

The operating section 8 is an interface that is attached to the case of the muscle relaxation monitoring apparatus 1, and that is used for performing various inputs to the muscle relaxation monitoring apparatus 1. When the operating section 8 is operated in order to select, as the operation mode, the calibration mode (the pre-muscle relaxation calibration mode or the post-muscle relaxation calibration mode) in which the calibration process is to be executed, or the muscle relaxation monitoring mode that is to be selected when a muscle relaxation monitoring process is to be executed in the stimulation mode, for example, the operation signal is output to the controller 9.

The controller 9 is configured by various processors such as a CPU (Central Processing Unit), a ROM, and a RAM. The controller 9 generally controls the sections constituting the muscle relaxation monitoring apparatus 1 while activating a predetermined process program based on various operation signals that are supplied from the operating section 8, to execute a predetermined process. When the operating section 8 is operated, and the calibration mode is selected as the operation mode, for example, the controller 9 appropriately controls the calibration processing section 4, the stimulation generator 6, and the response detector 7, and executes the calibration process according to the calibration mode that is set.

In the case where the calibration process according to the post-muscle relaxation calibration mode is executed, the muscle relaxation monitoring mode is already executed, and therefore the controller 9 changes the emergency stimulation current value that is used in the executed muscle relaxation monitoring mode, to the acquired stimulation current value of the supramaximal stimulation, and then continues the muscle relaxation monitoring mode.

The storage section 10 is an auxiliary storage device that stores various data, and stores various data that are necessary for driving the muscle relaxation monitoring apparatus 1, such as operation programs for the stimulation modes. Moreover, the stimulation current value of the supramaximal stimulation of the subject that is acquired in the calibration mode is written by the controller 9 in the storage section 10, and used in the case of the muscle relaxation monitoring mode.

<Process Operation>

Figure 2:
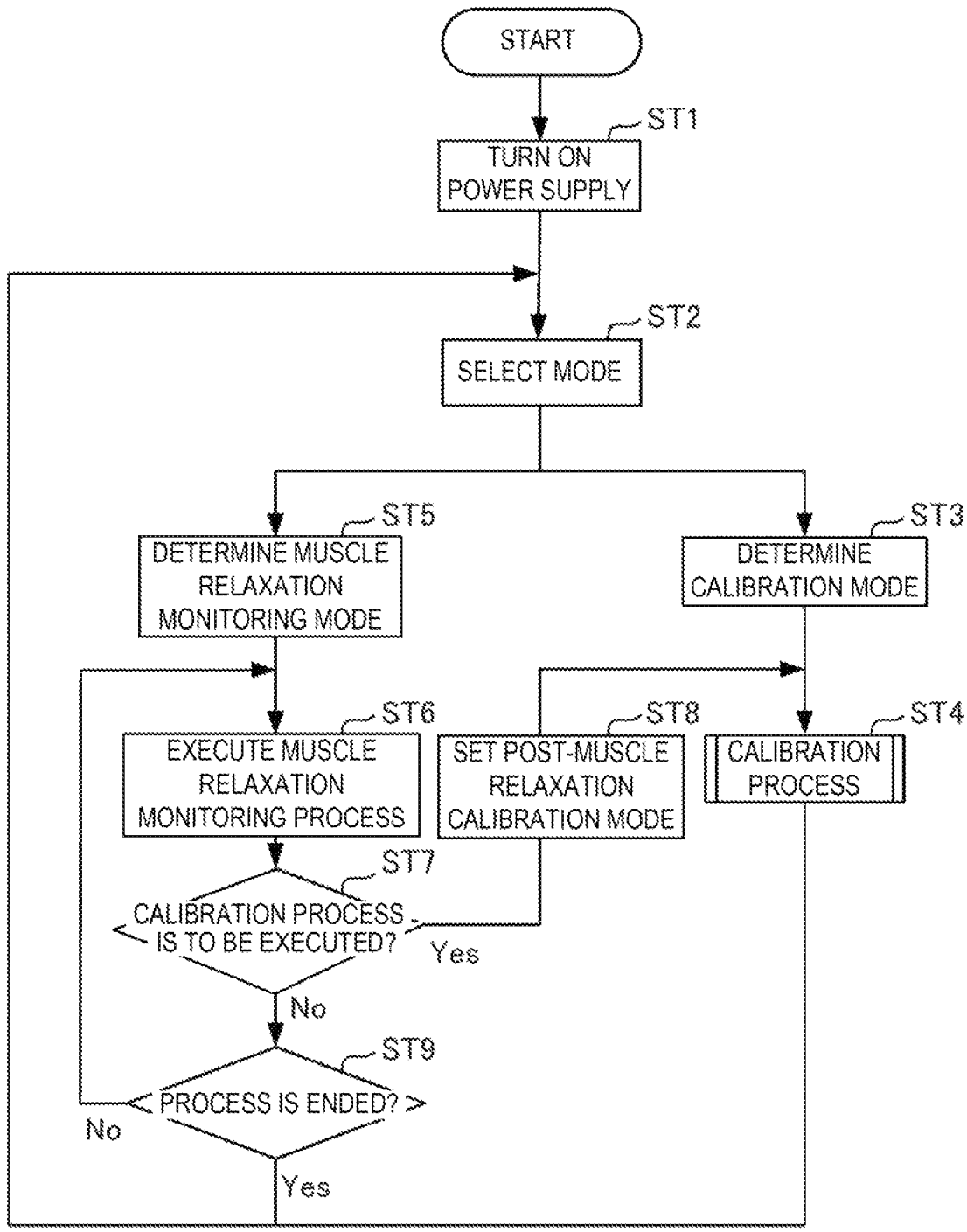
FIG. 2 is a flowchart of a series of process operations of the muscle relaxation monitoring apparatus.
Figure 3:
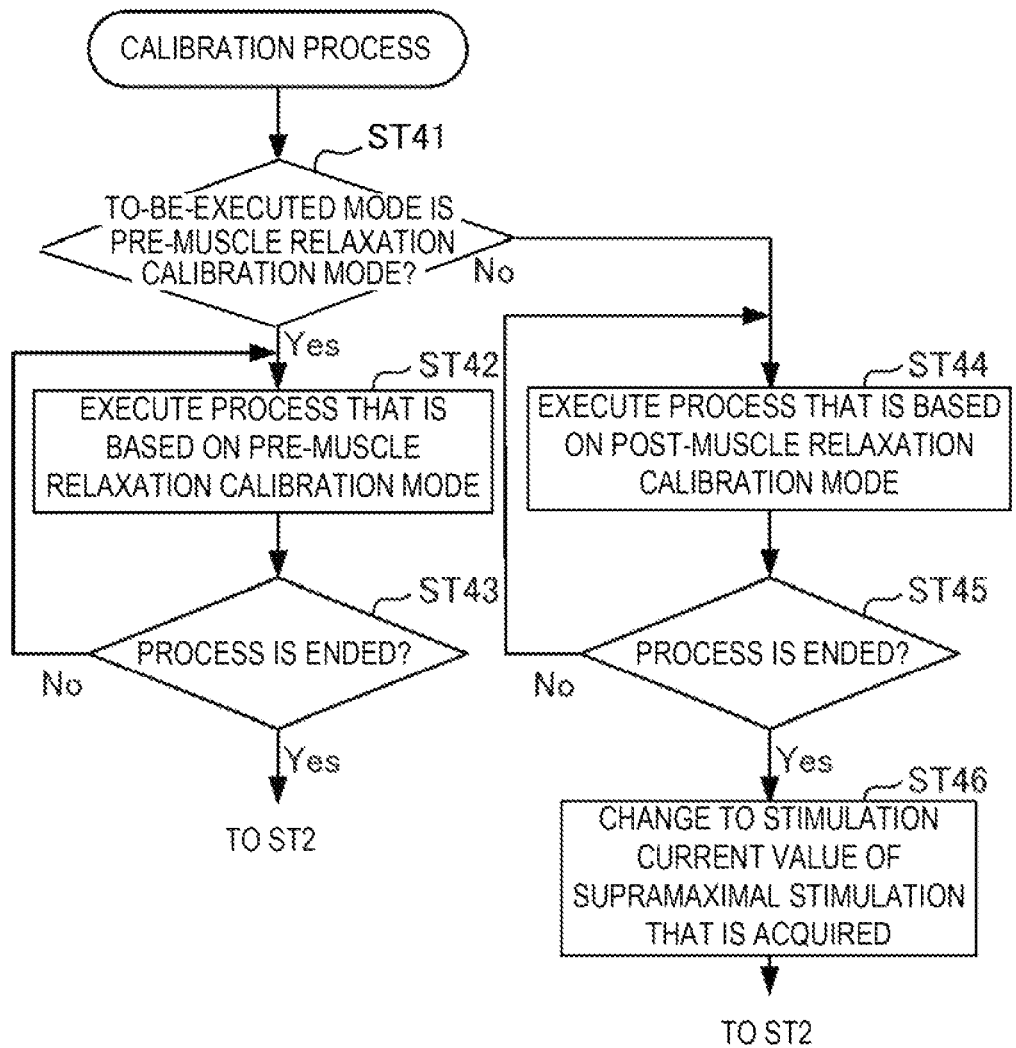
FIG. 3 is a flowchart of process operations in a calibration process.

Referring to FIGS. 2 and 3, next, the process operation of the above-described muscle relaxation monitoring apparatus 1 will be described. FIG. 2 is a flowchart of a series of process operations of the muscle relaxation monitoring apparatus 1, and FIG. 3 is a flowchart of process operations in the calibration process.

The operations that will be described indicate elements of steps in an exemplified order, and not limited to the presented specific order. Therefore, the flowcharts illustrated in FIGS. 2 and 3 can be exchanged in order as far as process results are consistent with each other.

<Process of Whole Apparatus>

As illustrated in FIG. 2, in order to cause the muscle relaxation monitoring apparatus 1 to operate, the user turns on the power supply of the muscle relaxation monitoring apparatus 1 (ST1), and operates the operating section 8 to select the operation mode (ST2).

If, in ST2, "calibration mode" is selected and determined as the operation mode (ST3), the controller 9 executes "calibration process" in which a process according to the calibration mode is performed to acquire the stimulation current value of the supramaximal stimulation of the subject (ST4). "Calibration process" in ST4 will be described in detail later with reference to FIG. 3.

When the stimulation current value of the supramaximal stimulation of the subject is acquired in ST4, the control returns to ST2. After the calibration process, usually, the muscle relaxation monitoring mode is selected by the user as the operation mode in the next step, and the control is transferred to the muscle relaxation monitoring process for the subject.

If, in ST2, "muscle relaxation monitoring mode" is selected and determined as the operation mode (ST5), the muscle relaxation monitoring apparatus 1 executes "muscle relaxation monitoring process" in which a process according to the muscle relaxation monitoring mode is performed to monitor the muscle relaxation state of the subject (ST6).

In the muscle relaxation monitoring process of ST6, the muscle relaxation monitoring apparatus 1 monitors the degree of progress of the muscle relaxation due to administration of the muscle relaxant agent to the subject, based on the stimulation response value that is produced by the electrical stimulation in the stimulation mode. In the monitoring of the muscle relaxation state, the controller 9 controls the stimulation mode setting section 5 so as to select an adequate stimulation mode according to the degree of progress of the muscle relaxation. In accordance with the selected stimulation mode, the controller 9 controls the stimulation generator 6 so as to electrically stimulate a peripheral nerve leading to a muscle in the observation portion. Then, the controller 9 controls the response detector 7 so as to acquire a stimulation response that is based on an electrical stimulation according to a stimulation mode such as the TOF ratio or the TOF count, and output stimulation response values according to these stimulation responses to the patient monitor 100 through the inputting/outputting section 2.

During the execution of ST6, the controller 9 determines whether the calibration process is to be executed or not (ST7).

If, in ST7, the controller 9 determines that the calibration process is to be executed (ST7-Yes), the controller sets the post-muscle relaxation calibration mode as the calibration mode (ST8), and then the control is transferred to ST4.

By contrast, if, in ST7, the controller 9 determines that the calibration process is not to be executed (ST7-No), the controller determines whether the muscle relaxation monitoring process is ended or not (ST9). If the controller determines that the muscle relaxation monitoring process is ended (ST9-Yes), the process is ended, and the control again returns to ST2. If, in ST9, the controller 9 determines that the muscle relaxation monitoring process is not ended (ST9-No), the control returns to ST6, and the muscle relaxation monitoring process is continued.

<Calibration Process>

Next, a series of operations of the calibration process in the calibration mode will be described with reference to FIG. 3.

When the calibration mode is selected, as illustrated in FIG. 3, the calibration processing section 4 determines whether the calibration mode that is set by the mode setting section 3 is the pre-muscle relaxation calibration mode or not (ST41).

If, in ST41, the calibration processing section 4 determines that the calibration mode that is set is the pre-muscle relaxation calibration mode (ST41-Yes), the section executes a calibration process that is based on the pre-muscle relaxation calibration mode (ST42).

The calibration processing section 4 starts the pre-muscle relaxation calibration process by a preset initial stimulation current value, detects the amplitude peak value that is based on an electrical stimulation of a stimulation current value which is obtained by reducing a predetermined current value from the initial stimulation current value, detects, at the next pre-muscle relaxation stimulation timing, the amplitude peak value that is based on an electrical stimulation of a stimulation current value which is obtained by reducing a predetermined current value from the immediately preceding stimulation current value, and compares the both peak values to determine whether the peak value after the reduction of the current value is reduced or not.

If it is determined that the peak value after the reduction of the current value is reduced, the calibration processing section 4 detects the stimulation current value before the reduction of the current value (i.e., the immediately preceding stimulation current value) as the stimulation current value of the maximal stimulation of the subject. Then, the calibration processing section 4 acquires a stimulation current value that is obtained by adding a predetermined current value to the stimulation current value of the maximal stimulation, as the stimulation current value of the supramaximal stimulation.

If it is determined that the both peak values are equivalent to each other, the peak value after the reduction of the current value is saturated, and therefore the calibration processing section 4 detects, in a subsequent process, the amplitude peak value that is based on an electrical stimulation of a stimulation current value which is obtained by further reducing a predetermined current value from the immediately preceding stimulation current value at each pre-muscle relaxation stimulation timing. Then, the calibration processing section 4 compares the presently detected amplitude peak value with the previously acquired amplitude peak value, and, when it is confirmed that the presently detected amplitude peak value is reduced, detects the stimulation current value before the reduction of the current value as the stimulation current value of the maximal stimulation of the subject. Then, the calibration processing section 4 acquires a stimulation current value that is obtained by adding a predetermined current value to the stimulation current value of the maximal stimulation, as the stimulation current value of the supramaximal stimulation.

Thereafter, the calibration processing section 4 determines whether the process based on the pre-muscle relaxation calibration mode is ended or not (ST43). If it is determined that the process is ended (ST 43-Yes), the control is transferred to ST2 in FIG. 2. If the calibration processing section 4 determines that the process based on the pre-muscle relaxation calibration mode is not ended (ST43-No), the control returns to ST42, and the process based on the pre-muscle relaxation calibration mode is continued.

By contrast, if, in ST41, the calibration processing section 4 determines that the calibration mode that is set is the post-muscle relaxation calibration mode (ST41-No), the section executes a calibration process that is based on the post-muscle relaxation calibration mode (ST44).

In a post-muscle relaxation calibration process, the calibration processing section 4 detects the amplitude peak value that is based on an electrical stimulation of a preset stimulation current value, detects, at the next post-muscle relaxation stimulation timing, the amplitude peak value that is based on an electrical stimulation of a stimulation current value which is obtained by reducing a predetermined current value from the immediately preceding stimulation current value, and compares the both peak values to determine whether the peak value after the reduction of the current value is reduced or not.

The calibration processing section 4 starts the post-muscle relaxation calibration process by a preset initial stimulation current value, detects the amplitude peak value that is based on an electrical stimulation of a stimulation current value which is obtained by reducing a predetermined current value from the initial stimulation current value, detects, at the next post-muscle relaxation stimulation timing, the amplitude peak value that is based on an electrical stimulation of a stimulation current value which is obtained by reducing a predetermined current value from the immediately preceding stimulation current value, and compares the both peak values to determine whether the peak value after the reduction of the current value is reduced or not.

If it is determined that the peak value after the reduction of the current value is reduced, the calibration processing section 4 detects the stimulation current value before the reduction of the current value (i.e., the immediately preceding stimulation current value) as the stimulation current value of the maximal stimulation of the subject. Then, the calibration processing section 4 acquires a stimulation current value that is obtained by adding a predetermined current value to the stimulation current value of the maximal stimulation, as the stimulation current value of the supramaximal stimulation.

If it is determined that the both peak values are equivalent to each other, the peak value after the reduction of the current value is saturated, and therefore the calibration processing section 4 detects, in a subsequent process, the amplitude peak value that is based on an electrical stimulation of a stimulation current value which is obtained by reducing a predetermined current value from the immediately preceding stimulation current value at each post-muscle relaxation stimulation timing. Then, the calibration processing section 4 compares the presently detected amplitude peak value with the previously acquired amplitude peak value, and, when it is confirmed that the presently detected amplitude peak value is reduced, detects the stimulation current value before the reduction of the current value as the stimulation current value of the maximal stimulation of the subject. Then, the calibration processing section 4 acquires a stimulation current value that is obtained by adding a predetermined current value to the stimulation current value of the maximal stimulation, as the stimulation current value of the supramaximal stimulation.

Thereafter, the calibration processing section 4 determines whether the process based on the post-muscle relaxation calibration mode is ended or not (ST45). If it is determined that the process is ended (ST 45-Yes), the emergency stimulation current value that is used in the currently executed muscle relaxation monitoring mode is changed to the stimulation current value of the supramaximal stimulation that is acquired in the calibration process (ST46), and the control is transferred to ST2 in FIG. 2. Even in the case where the calibration process cannot be executed in an emergency, therefore, a stable muscle relaxation monitoring process can be executed by using the stimulation current value of the supramaximal stimulation of the current subject.

If, in ST45, the calibration processing section 4 determines that the process based on the post-muscle relaxation calibration mode is not ended (ST45-No), by contrast, the control returns to ST44, and the process based on the post-muscle relaxation calibration mode is continued.

Function Effects

As described above, the muscle relaxation monitoring apparatus 1 of the embodiment includes the calibration processing section 4 for performing a calibration process that electrically stimulates the nerve which is the observation portion of the subject, by a predetermined stimulation current value at a predetermined stimulation timing, and that acquires the stimulation current value of the supramaximal stimulation exceeding the maximal stimulation of the subject, based on an amplitude peak value of an electric signal that is based on a stimulation response of a muscle due to the electrical stimulation, and the calibration processing section 4 performs, when the subject is in an awake state, the calibration process while using the pre-muscle relaxation stimulation timing that is preset, and that is the first stimulation timing, as the stimulation timing, and, when the subject is in the muscle relaxation state, performs the calibration process while using the post-muscle relaxation stimulation timing that is the second stimulation timing which is longer in period than the first stimulation timing, as the stimulation timing.

The subject in the muscle relaxation state requires a longer time period elapsing from a contraction of a muscle until the muscle recovers to the state obtained before the contraction, as compared with the case of an awake state. When the subject is in the muscle relaxation state, however, the calibration process is performed based on the second stimulation timing in which the period is set to be longer than that of the first stimulation timing, and therefore it is possible to acquire the stimulation current value of the supramaximal stimulation according to the subject in the muscle relaxation state.

In the muscle relaxation monitoring apparatus 1 of the embodiment, the post-muscle relaxation stimulation timing that is the second stimulation timing is set in the range of 0.5 Hz to 1 Hz based on a time period elapsing from a timing when, after administration of a muscle relaxant agent, the muscle in the muscle relaxation state is caused to contract by the electrical stimulation, to recovery to the state obtained before the muscle contraction.

As a physiological response, a muscle requires about 1 second to recover from contraction to a state obtained before the contraction. In the case where a calibration process is to be performed on a subject in the muscle relaxation state, therefore, the post-muscle relaxation stimulation timing that is the second stimulation timing is set in the range of 0.5 Hz to 1 Hz based on physiological finding, thereby enabling the stimulation current value of the supramaximal stimulation according to the subject in the muscle relaxation state to be acquired.

In the muscle relaxation monitoring apparatus 1 of the embodiment, the calibration process on the subject who is after muscle relaxation is executed in a situation where a stimulation response to an electrical stimulation applied to the subject who is after muscle relaxation can be confirmed.

Even when the subject is in the muscle relaxation state, therefore, a stimulation response to an electrical stimulation applied to a muscle can be confirmed, and hence the stimulation current value of the supramaximal stimulation according to the subject in the muscle relaxation state can be acquired.

The calibration processing method of the embodiment includes: a process of, when a subject is in an awake state, performing an electrical stimulation of a stimulation current value while using a first stimulation timing that is preset, as a stimulation timing, and detecting an amplitude peak value of an electric signal that is based on a stimulation response of a muscle; and a process of, when the subject is in a muscle relaxation state, performing an electrical stimulation of a the stimulation current value while using a second stimulation timing that is longer in period than the first stimulation timing, as the stimulation timing, and detecting an amplitude peak value of an electric signal that is based on a stimulation response of the muscle.

A subject in a muscle relaxation state requires a longer time period elapsing from a contraction of a muscle until the muscle recovers to the state obtained before the contraction, as compared with the case of an awake state. When the subject is in the muscle relaxation state, however, the calibration process is performed at the second stimulation timing in which the period is set to be longer than that of the first stimulation timing, and therefore it is possible to acquire the stimulation current value of the supramaximal stimulation according to the subject in the muscle relaxation state.

Although, in the above description, the embodiment in which an electromyography that monitors the muscle relaxation state or the awake state during surgery, based on the myopotential of a subject is used as the muscle relaxation monitoring apparatus 1 has been described, the type of the monitor is not particularly limited as far as the muscle relaxation monitor performs a calibration process for acquiring the stimulation current value of the supramaximal stimulation of the subject. Another mode of the muscle relaxation monitoring apparatus 1 may be, for example, an apparatus that sequentially observes the muscle contraction state of a muscle which is the observation portion, and can objectively monitor the muscle relaxation state of the subject, such as an acceleromyography (AMG) that uses an acceleration transducer.

In the above-described embodiment, the inputting/outputting section 2 of the muscle relaxation monitoring apparatus 1 has the mode where the stimulation response value acquired by the muscle relaxation monitoring apparatus 1 is displayed on the screen of the patient monitor 100 that is the connection destination. However, the mode is not limited to this. A configuration in which the muscle relaxation monitoring apparatus 1 includes a displaying section that can display the stimulation response value may be employed as the display destination of the stimulation response value. Moreover, the display destination of the stimulation response value may be a displaying apparatus that is separated from the muscle relaxation monitoring apparatus 1 (for example, a displaying apparatus such as an organic or inorganic EL display, or a liquid crystal display, or a portable terminal such as a smartphone or a tablet terminal).

In the above-described embodiment, a function (notification function) of, when a calibration process is not performed before surgery, detecting the situation, and issuing a notification for prompting to perform a calibration process during surgery may be added. In order to realize the notification function, a notifying section for performing a displaying notification (lighting, blinking) or a sounding notification may be provided, and, when the controller 9 determines that a calibration process is not performed before surgery, this situation may be notified. For example, a notifying timing may be set in a time period when the muscle relaxation monitoring apparatus 1 can perform a calibration process.

This application claims priority to Japanese Patent Application No. 2019-198592 filed on Oct. 31, 2019, the entire content of which is incorporated herein by reference.

INDUSTRIAL APPLICABILITY

According to the present disclosed subject matter, there is provided a muscle relaxation monitoring apparatus and a calibration processing method in which it is possible to detect a stimulation current value that causes the supramaximal stimulation according to a subject in the muscle relaxation state.

The invention claimed is:

1. A muscle relaxation monitoring apparatus comprising:
a controller;
a stimulation generator configured to generate an electrical stimulation signal to be applied to a nerve of a subject;
a response detector configured to detect a stimulation response of a muscle of the subject to the electrical stimulation; and
a calibration processing section controlled by the controller, the calibration processing section being configured to perform a calibration that:
    directs the stimulation generator to apply a predetermined stimulation current value at a predetermined stimulation timing to the nerve; and
    acquires, from the response detector, a stimulation current value of a supramaximal stimulation exceeding a maximal stimulation of the subject, based on an amplitude peak value of an electric signal corresponding to the stimulation response of the muscle,
wherein the stimulation response is used with the stimulation current value to determine muscle's relaxation state for administration of a muscle relaxant agent or a muscle relaxation recovery agent;
wherein the calibration is based on a first preset stimulation timing when the subject is in an awake state, and
the calibration is based on a second preset stimulation timing that is longer than the first preset stimulation timing when the subject is in a muscle relaxation state.

2. The muscle relaxation monitoring apparatus according to claim 1,
wherein the muscle is in the muscle relaxation state after administration of the muscle relaxant agent, and
wherein the second preset stimulation timing is set based on a time period for the muscle in the muscle relaxation state to recover from contraction caused by the electrical stimulation to a state obtained before the contraction.

3. The muscle relaxation monitoring apparatus according to claim 1, wherein the second preset stimulation timing is set in a range of 0.5 Hz to 1 Hz.

4. The muscle relaxation monitoring apparatus according to claim 1, wherein the calibration process on the subject who is after the muscle relaxation state is executed in a situation where the stimulation response to the electrical stimulation applied to the subject who is after the muscle relaxation state is confirmed.

5. A calibration processing method, comprising:
generating an electrical stimulation signal;
applying the electrical stimulation signal to a nerve of a subject using a predetermined stimulation current value at a predetermined stimulation timing;
detecting a stimulation response of a muscle of the subject to the electrical stimulation;
acquiring, based on an amplitude peak value of an electric signal corresponding to the stimulation response of the muscle, a stimulation current value of a supramaximal stimulation exceeding a maximal stimulation of the subject,
wherein the stimulation response is used with the stimulation current value to determine muscle's relaxation state for administration of a muscle relaxant agent or a muscle relaxation recovery agent;
performing an electrical stimulation of the stimulation current value based on a first preset stimulation timing when the subject is in an awake state; and
performing an electrical stimulation of the stimulation current value based on a second preset stimulation timing that is longer than the first preset stimulation timing when the subject is in a muscle relaxation state.

* * * * *